(12) United States Patent
Taghavi et al.

(10) Patent No.: US 9,569,739 B2
(45) Date of Patent: Feb. 14, 2017

(54) PREDICTING AND MANAGING IMPACTS FROM CATASTROPHIC EVENTS USING WEIGHTED PERIOD EVENT TABLES

(71) Applicant: Risk Management Solutions, Inc., Newark, CA (US)

(72) Inventors: Shahram Taghavi, San Francisco, CA (US); Nirmal Jayaram, Union City, CA (US)

(73) Assignee: Risk Management Solutions, Inc., Newark, CA (US)

( * ) Notice: Subject to any disclaimer, the term of this patent is extended or adjusted under 35 U.S.C. 154(b) by 649 days.

(21) Appl. No.: 13/799,120

(22) Filed: Mar. 13, 2013

(65) Prior Publication Data

US 2014/0278306 A1    Sep. 18, 2014

(51) Int. Cl.
| | |
|---|---|
| *G06F 17/50* | (2006.01) |
| *G06Q 10/06* | (2012.01) |
| *G06Q 30/02* | (2012.01) |
| *G06Q 40/08* | (2012.01) |

(52) U.S. Cl.
CPC .......... *G06Q 10/06* (2013.01); *G06Q 30/0283* (2013.01); *G06Q 40/08* (2013.01); *G06F 17/5009* (2013.01)

(58) Field of Classification Search
USPC ................................ 703/2, 6; 702/60; 705/4
See application file for complete search history.

(56) References Cited

U.S. PATENT DOCUMENTS

| | | | | |
|---|---|---|---|---|
| 2008/0154652 | A1* | 6/2008 | Bresch | G06Q 40/08 705/4 |
| 2010/0082382 | A1 | 4/2010 | Kisin et al. | |
| 2011/0153368 | A1 | 6/2011 | Pierre et al. | |
| 2012/0150570 | A1* | 6/2012 | Samad-Khan | G06Q 10/0635 705/4 |
| 2015/0094968 | A1* | 4/2015 | Jia | G06Q 40/04 702/60 |

FOREIGN PATENT DOCUMENTS

| | | |
|---|---|---|
| JP | H 02-125284 A | 5/1990 |
| JP | 2008-171348 A | 7/2008 |
| JP | 2011-70509 A | 4/2011 |

OTHER PUBLICATIONS

European Extended Search Report, European Application No. 14159661.9, May 9, 2014, 5 pages.
"Statement in Accordance with the Notice from the European Patent Office Dated Oct. 1, 2007 Concerning Business Methods," Oct. 1, 2007, 2 pages.
Australian Office Action, Australian Application No. 2014201088, Apr. 24, 2015, 4 pages.
Japanese Office Action, Japanese Application No. 2014-047640, Dec. 24, 2014, 6 pages.
Australian Second Examination Report, Australian Application No. 2014201088, Mar. 10, 2016, 3 pages.
Australian Third Examination Report, Australian Application No. 2014201088, Apr. 20, 2016, 3 pages.

* cited by examiner

*Primary Examiner* — Thai Phan
(74) *Attorney, Agent, or Firm* — Fenwick & West LLP

(57) ABSTRACT

A system stochastically models events related to potential perils (e.g., hurricanes, terrorist attacks) using a weighted period event table. Both rare and likely events are captured in modeling with minimal computational overhead, allowing appropriate allocation of resources. Applications include disaster response, municipal planning, financial risk modeling and allocation.

18 Claims, 7 Drawing Sheets

PREDICTING AND MANAGING IMPACTS FROM CATASTROPHIC EVENTS USING WEIGHTED PERIOD EVENT TABLES

BACKGROUND

Technical Field

The subject matter described herein generally relates to the field of predicting and managing catastrophic event impacts, and more specifically to modeling scenarios involving one or more catastrophic events and making decisions regarding mitigation accordingly.

Background Information

Numerous resources need to be deployed when disasters strike. Fire, police, National Guard and FEMA (Federal Emergency Management Agency) resources all need to be allocated in a sensible manner. For some disasters, coordination among two or more national governments may be required. Likewise, businesses need to allocate their resources in a similar fashion. For instance, if a retail establishment has a regional warehouse, it will want to know which stores are likely to be damaged (so goods are not shipped there) as well as which are nearby to the impacted area but are not likely to be damaged (so that goods can be shipped there to be available in the damaged area after the disaster).

Perhaps the most direct example of such allocation of resources in the face of a catastrophic event comes from the insurance industry. In that industry, multiple layers of insurers have often-overlapping coverage, all with limits (e.g., caps) and other constraints. Further, catastrophic events, even if randomly distributed, are sometimes bunched so that exposure seems unusually high. In addition, some catastrophic events tend not to be independent but instead are tied together, e.g., (a) a weather pattern breeds multiple cyclonic events during a single season; (b) a large earthquake is accompanied by a tsunami and numerous aftershocks; (c) a terrorist attack is not isolated but is planned as one of several coordinated attacks.

In the past, governments, aid organizations and businesses have come up with documents outlining certain "rules of engagement" with respect to addressing the impact of such catastrophic events. For example, a state National Guard unit may have one plan for mobilization within the state's boundaries, but a more complex and limited manner of engagement for mobilization when a neighboring state seeks its assistance.

As such rules and agreements play out, however, the complexity becomes quite difficult to manage. For instance, there is widespread public commentary regarding the number of different law enforcement agencies with jurisdiction in Washington, DC. The FEMA website page http://www.fema.gov/about/offices/ncr/index.shtm explains that there is an entire Office of National Capital Region Coordination to oversee and manage the overlapping responsibilities of various authorities in the region who should be included in catastrophic planning.

In the private sector, various responsibilities for addressing damage due to catastrophic events are typically spelled out in contracts. Allocating risks and responsibilities related to such events is a difficult task, and accuracy in prediction of needs can be quite beneficial, for example in determining the amount and location of emergency supplies to warehouse in various locations.

It would be advantageous to such allocation tasks if there were a system and method that could accurately model disaster event scenarios in a manner that did not consume excessive computational resources.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 5A illustrates WPET event population in accordance with one embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

As described herein, a system and method apply machine processing to predict where and how impacts caused by a catastrophic event are to be addressed. Such modeling can be used when allocations are first being negotiated, whenever review of exposure is desired by a stakeholder, when a disaster is imminent, and even during or after a catastrophic event (for instance with respect to event-response scenarios).

For context, in one application several organizations are interested in helping to insure against a natural disaster. Typically, the obligations of such organizations are set forth in a document with numerous terms, for instance detailing the nature of protection being provided and the locations covered. To add to the complexity, not just one organization (e.g., an insurance company) but several such organizations each may have overlapping responsibilities with respect to a given geographic area, piece of property, or facility. To avoid doubled-up resource allocations, typically there is some rule for determining which of several organizations has primary responsibility (and the extent of such responsibility), which has secondary, tertiary, and even further subordinate responsibility.

These various rules and terms inject a great amount of uncertainty and complexity in predicting the extent of exposure from various perils. Known approaches require a great amount of human interpretation and expert analysis, both to enter information initially and to interpret results after a catastrophic event. At times, low quality information has led to poor decision-making by various stakeholders.

As noted above, the discussion here has centered on one specific application in the insurance industry, but those skilled in the art will readily recognize other applications, e.g., deployment of emergency equipment to an area impacted by a natural disaster.

In order to more fully explain the systems and methods described above, what follows is a more detailed description of a system and method using a weighted period event table according to one embodiment.

Figure 1:
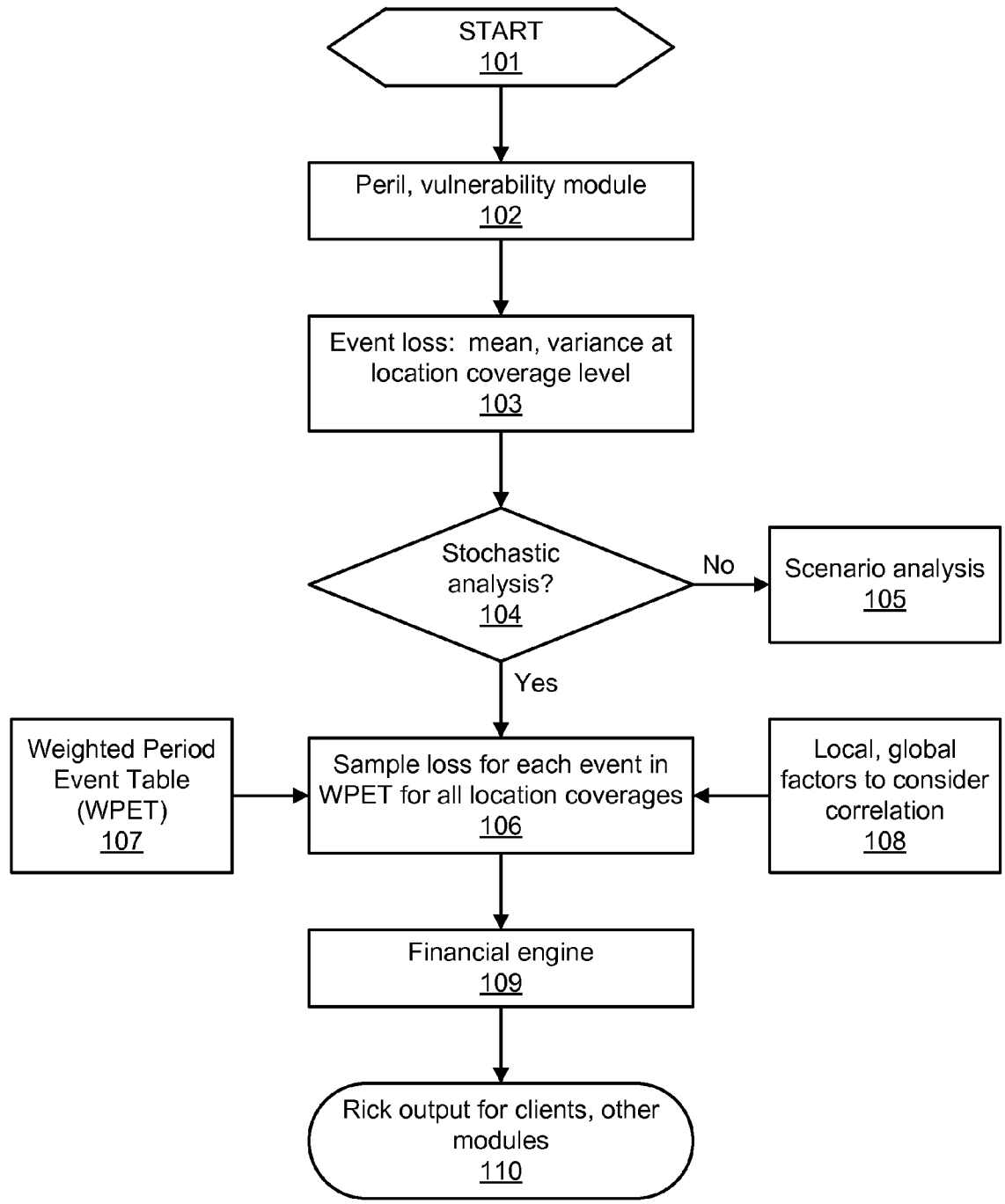
FIG. 1 illustrates a loss assessment framework using a weighted period event table (WPET).

Referring now to FIG. 1, there is shown a diagram of a framework 100 of modeling probabilistic events, such as natural disasters or terrorist attacks, and corresponding loss assessments, for example required deployments of mission personnel and materiel. FIG. 1 illustrates framework 100 by reference to various processing blocks, which can be thought of either as steps of a method or as processing modules for performing such steps.

Processing begins 101 by engaging, instantiating or otherwise enabling a number of processing modules or steps. At first, a peril, vulnerability processing module/step 102 operates by defining and scoping the perils and vulnerabilities to be addressed. In one embodiment, a peril module 102 identifies the events that can impact a portfolio of buildings and estimates the hazard induced by the peril at each location in the portfolio. For instance, for an earthquake peril, this includes identifying all earthquakes that impact the portfolio and identifying the extent of ground shaking at all locations, such as shown below.

| Earthquake event (Magnitude, fault combination) | Site ID | Spectral Acceleration |
|---|---|---|
| M6.0, San Andreas | 1 | .1 |
| M6.0, San Andreas | 2 | .12 |
| M6.0, San Andreas | 3 | .08 |
| M6.0, San Andreas | 4 | .2 |
| M7.0, Hayward | 1 | .2 |
| M7.0, Hayward | 2 | .18 |
| M7.0, Hayward | 3 | .12 |

Next, event loss processing 103 (which is in some embodiments performed using vulnerability module 102) determines the mean and coefficient of variation of event loss at the relevant location(s) for a specified coverage level. For example, one might model an earthquake impacting a given city neighborhood by stating that the following losses are expected:

| Earthquake Event (Magnitude, fault combination) | Site ID | Mean expected loss | Coefficient of variation |
|---|---|---|---|
| M6.0, San Andreas | 1 | $0.3 M | 2.3 |
| M6.0, San Andreas | 2 | $0.8 M | 2.4 |
| M6.0, San Andreas | 3 | $1.3 M | 2.4 |
| M6.0, San Andreas | 4 | $1.8 M | 2.6 |

-continued

| Earthquake Event (Magnitude, fault combination) | Site ID | Mean expected loss | Coefficient of variation |
|---|---|---|---|
| M7.0, Hayward | 1 | $3.0 M | 1.4 |
| M7.0, Hayward | 2 | $4.1 M | 1.8 |
| M7.0, Hayward | 3 | $5.5 M | 1.8 |

Next, processing moves to a decision 104 as to whether stochastic analysis is appropriate. In some cases, a scenario analysis is performed 105 in order to study the impact of a particular historical event or a scenario event on the portfolio. Specifically, one can simply posit various likely scenarios (e.g., What is the financial impact of a Hurricane Andrew-like event today in Florida, if the total insured value in the area is $842 M).

Many times, it is necessary to study the portfolio losses under not just one scenario event but under several possible events. For example, for some emergency response planning purposes, one might want to consider the probability that terrorists have planned to attack one city rather than another. Similarly, it is necessary to use multiple scenarios to consider the possibility that a hurricane might pass within ten miles, or 25 miles, of a city. Conventional scenario analysis is too simplistic to address all of the possibilities in such an instance, so it is appropriate to decide to use stochastic analysis to model the possibilities.

In that instance, processing flows to a module/step 106 in which a loss (e.g., financial loss for monetary planning, or other impact for emergency response team or military planning) is determined for each event in a weighted period event table (WPET) 107 using the mean and coefficient of variation information provided, for instance, by the vulnerability module, combined with local and global factors 108 that capture the potential correlation between the losses at multiple locations. Using the WPET provides insight into how the portfolio reacts to a combination of catastrophic events which can happen within a certain period of time. Using the hurricane example above, for instance, a WPET of hurricane events will be constructed with several probable hurricanes based on their corresponding annual rates, and the portfolio will be analyzed under all such hurricanes. Losses to the portfolio are then calculated for each event in the WPET by financial engine processing 109. The results are then used for generation of a risk output 110, e.g., to identify the hurricanes that cause large losses and the locations that suffer the most, as well as to determine the nature and recipient of the risk mitigation efforts or to further pass on the results to a different module for additional processing.

The use of WPET vs a regular PET (weighted vs regular) provides a more efficient way of analyzing the data and with a comparable effort, WPET is able to analyze a far more number of realizations of what can happen in reality compare to a regular PET and therefore, the outcome of an analysis under WPET methodology will be much more accurate and decision makers can be less uncertain toward their view of risk. The data associated with a WPET framework, as will be explained later in the document, provides relative weight to different scenarios and therefore, can provide a better insight by giving more weight to things that can happen more frequently while in regular PET, all weights are equal and to provide a fair balance between frequent and rate scenarios, a much more number of simulation is needed.

The results of such processing yield losses under each event in the catalog for all the locations of interest, which are then passed, as illustrated in the flow diagram, to a financial engine, which then generates risk measures such as gross losses of interests to specific clients or for other purposes (e.g., to provide client-specific losses based on insurance policies with corresponding limits, deductibles and other parameters).

The illustrated example shows processing by a financial engine 109, but in other applications, other logistical processors may be used as appropriate for the application. For instance, a deployment engine may be used instead of a financial engine when it is desired to figure out where to station emergency response and military personnel and where to warehouse emergency/defensive materiel so as to best be able to respond to such perils, as well as from what locations to deploy such resources once a first peril is realized. There may be situations in which only a certain number of local resources are deployed to address a peril, after which more remote resources are deployed to ensure that no facility has resources depleted beyond a certain threshold limit.

Military planners, FEMA personnel, municipalities, and businesses of various types are all interested in being able to model expected outcomes from various peril possibilities, but conventional approaches have been overly complex and unable to scale to the amount of variability commonly seen in the real world.

Figure 2:
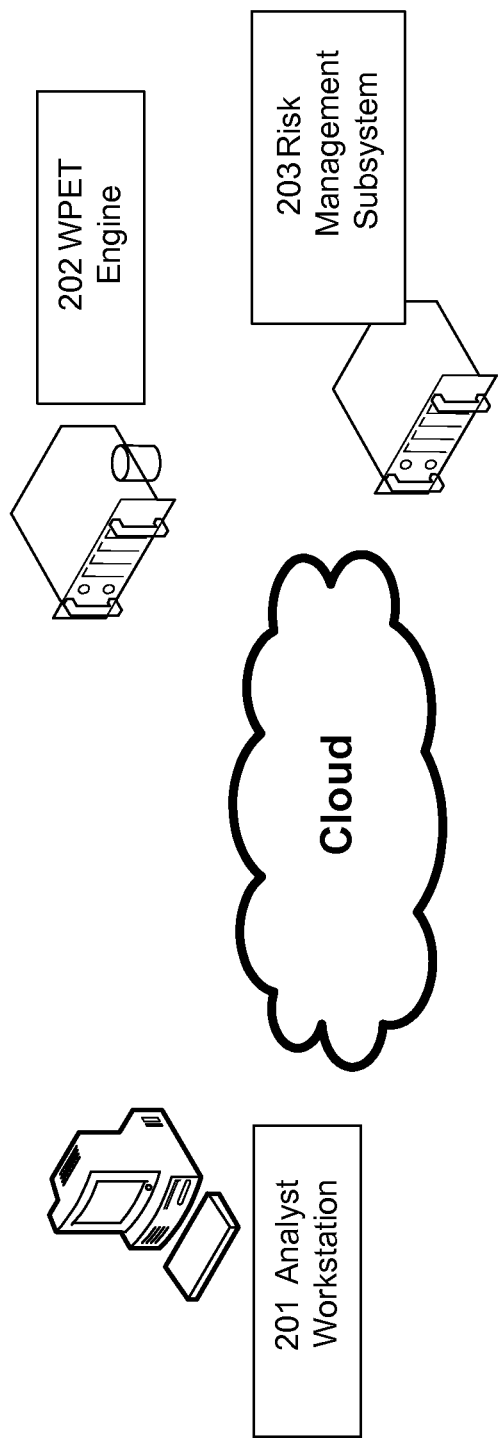
FIG. 2 illustrates WPET-based processing in accordance with one embodiment of a system for allocating resources.

Referring now to FIG. 2, there is illustrated a typical modeling platform as discussed herein. WPET engine 202, in one embodiment a server computer, models risk per instructions from an analyst workstation 201 via a network (referred to as "cloud" to indicate the availability of any appropriate network topology, e.g., a LAN, WAN, or broadly speaking, the Internet). Results from processing of WPET engine 202 are applied to a risk management subsystem 203, again a server computing system in one environment, from which is determined any desired risk exposure metric or variable (e.g., number of blankets needed for warehousing to meet need on "expected plus one standard deviation" basis).

The WPET engine 202 takes as input the parameters needed to define scenarios for the downstream engines. For example, in a hurricane model, input parameters can be which set of hurricane models are of interest, what event rate set is going to be used for the analysis, and whether there is any correlation or clustering among hurricane events. The WPET engine 202 then considers these input parameters and data sets to create many different scenarios together with a probability of occurrence which the risk portfolio might expect in the future. Once the scenarios are simulated by the WPET engine 202, downstream systems such as risk management subsystem 203 calculate the losses for each scenario and then the loss metric that will be used for decision making purposes, based on the probabilities determined by the WPET engine 202.

General System Architecture

Figure 3:
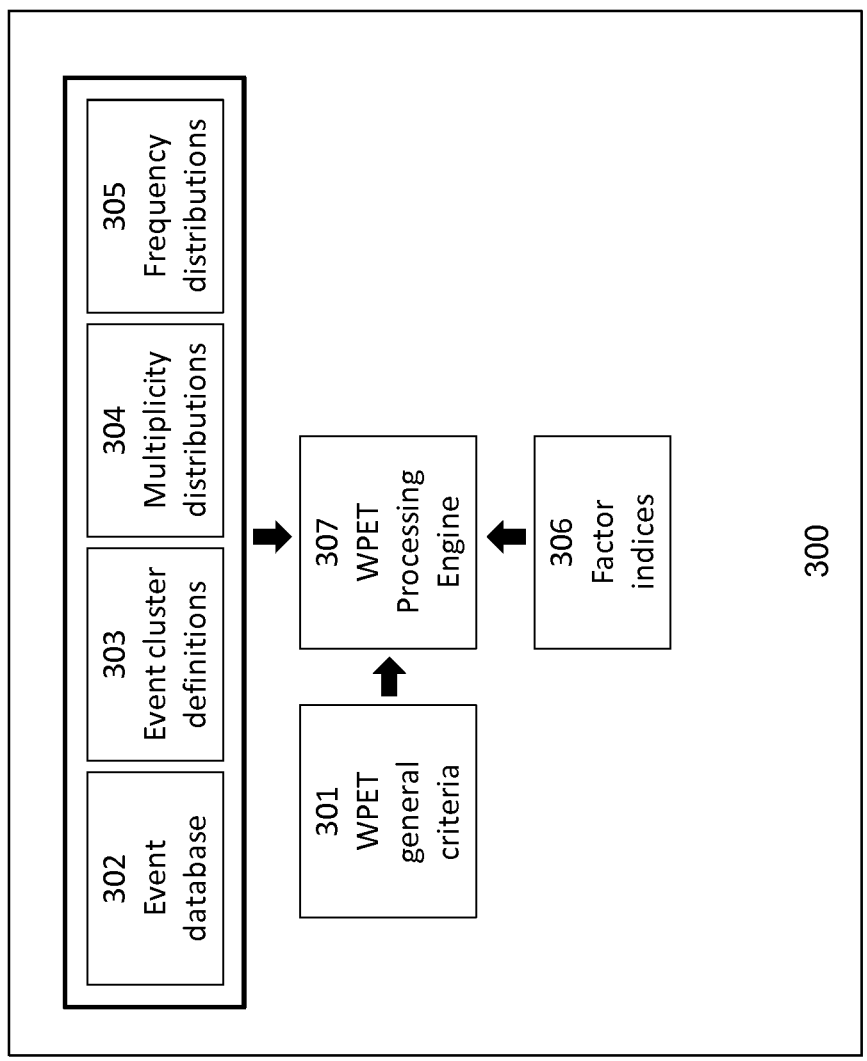
FIG. 3 illustrates a WPET-based modeling system disclosed herein.

FIG. 3 below is a block diagram illustrating the high-level components of a system 300 for WPET processing as described herein, such as may be used to provide processing referred to in connection with WPET engine 202 of FIG. 2. The overall characteristics of the desired WPET are defined in block 301, in one embodiment in a manner that is largely model independent and high level. Initial number of periods, rate tolerance, and minimum number of occurrences are examples of the WPET criteria defined in one embodiment in block 301. These conditions are applied generally for any WPET processed by system 300.

Additional event definitions are stored in blocks 302-305. The event set is defined in block 302 which lists the stochastic event set specific to a model. Blocks 303 to 305 are used in some embodiments to address additional sets of information and as may be defined based on specific requirements in an environment of use of system 300. Information regarding how different events can be groups together is managed based on the event cluster definitions of block 303 and the multiplicity definitions of block 304. This information is used in embodiments in which it is desired to introduce seasonality and correlation in the event sets. Block 305 defines the variability of different periods in terms of number of events that will be used by WPET processing engine 202 to distribute events into different periods.

The constituent components of system 300 described above (301-305) and data storage subsystem 301 are in some embodiments implemented in one or more database systems holding event information relating to event occurrences in a WPET. In one embodiment, subsystems 302-305 are implemented by a blade server system on which a relational database application has been structured to provide a WPET as described herein. However, as set forth with regard to FIG. 4, in other embodiments other types of processors and computing systems are usable to perform such processing as well.

The event information pertinent to system 300 varies from one peril to another peril and from one region to another region. Typically, this information provides all possible single event scenarios which can happen in that peril/region, but there is no knowledge of how these events can happen together in a year or, in the case of a multi-year insurance contract, how events might line up during the lifetime of the contract. A primary task of the WPET engine 202 is to get these raw events and combine them with other factors, rules and conditions to create different scenarios in the time domain that satisfy the conditions of that peril/region. Such processing is found to better represent reality, compared to calculating the event consequences as they were happening independent of each other.

A factor indices module 306 allows modelers, municipal planners and other types of users of system 300 to specify certain input factors of relevance (indices) for the specific modeling that is desired. Module 306 is implemented, in one embodiment, as a data service in communication with a server-based host application to provide the factors that go into the WPET processing engine and will be used for sampling of values provided by the other modules.

The output of modules 301-306 are applied to a processing module 307 providing the core WPET processing as described herein. Those skilled in the art will recognize that any sort of communication among the modules described herein, or similar modules, could also be used should other architectures for system 300 be desired.

Factors and parameters used in WPET processing may come either from a client application as model inputs or may be stored in the model data itself. The two sources of parameters and factors are then applied to the data set by the WPET engine 202 to create scenarios. The input factors and event set information are also used to provide the probability of each of these scenarios to downstream engines for calculation of loss metrics. Thus, WPET processing operates to generate event scenarios corresponding to the peril/region and input factors.

Computing Machine Architecture

Figure 4:
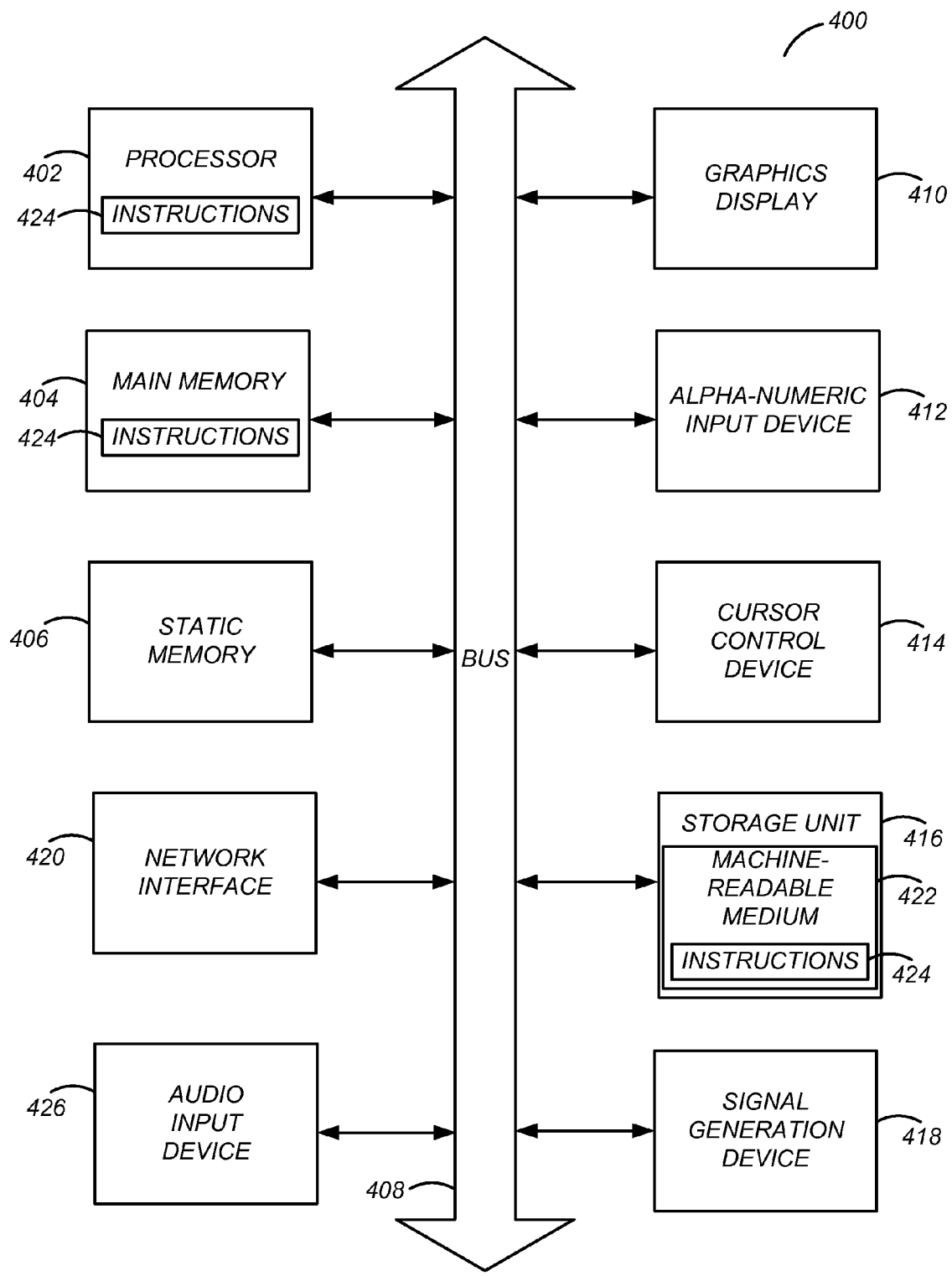
FIG. 4 illustrates components of an example machine able to read instructions from a machine-readable medium and execute those instructions in a processor.

FIG. 4 is a block diagram illustrating components of an example machine able to read instructions from a machine-readable medium and execute those instructions in a processor to perform the machine processing tasks discussed herein, such as the WPET engine operations discussed above. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but should not be limited to, data repositories in the form of solid-state memories, optical media, and magnetic media.

Implementation and Application

Application of WPET-based processing as described herein is appropriate in a variety of circumstances. As discussed above, location and deployment of resources for emergency response and military situations is one example. Another is risk quantification to facilitate risk management, which has application in financial industry niches such as within the insurance industry, and also in other areas such as municipal planning, public policy determinations, and determination of cost-effectiveness of construction projects and construction project options. For instance, a hotel company looking to locate a new property in coastal Florida, or nearby a fault line, may consider various options that present different risk profiles, and the cost-benefit analysis used to select a particular option is appropriate driven by complex considerations as addressed using WPET-based processing.

Below are further details on PET processing and WPET applications by way of exemplary embodiments.

PET Content/Format

Each row in PET table contains the following fields:
Simulation period
Event ID
Year
Day
Factor Index
Weight Each "simulation period" is a possible future outcome of events. "Year" and "day" define the event occurrence time. "Event ID" indicates which event has happened in a period. "Factor Index" is a key that quantifies how much the loss for this specific event is above or below the mean value. "Weight" specifies the relative importance of each period that helps address challenges regarding high frequency/low frequency events discussed below.

To calculate loss statistics from PET, each period (which could consist of several lines in the PET table depending on how many events occurred in that period) is considered separately; the desired loss (financial perspective and aggregation level) is applied; then the result is multiplied by the weight for that period and summed up.

High and Low Frequency Events

The simplest form for the PET is one in which all the periods have the same weight, i.e. the weight for every period equals one divided by number of simulated periods. To illustrate some of the challenges that arise with a constant weight consider the following exemplary PET statistics for earthquake and hurricane risks.

One earthquake event set has 382,028 events with rates as high as 0.23 and as low as 5e-13. In order to capture the event with the lowest rate, 2e12 periods would be needed, meaning that the PET table would have 1e14 lines. Also, in 2e12 periods, the event with the highest rate would be sampled 5e11 times. Thus, a great amount of overhead is required to support capturing events with low rates. In contrast, WPET representation requires a PET with only 3e6 rows (an order of 3e7 smaller). How this saving is achieved using weighted PET is explained in the next section.

PET Creation Methodology

Regular PET (which is also the first step of Weighted PET)

Assume we have the following event table:

| | Event ID | Event Rate |
|---|---|---|
| 1 | 101 | 0.42 |
| 2 | 201 | 0.1 |
| 3 | 301 | 0.05 |
| 4 | 302 | 0.05 |
| 5 | 401 | 0.01 |

In a regular PET (with no weights) type of simulation, we could have a PET like the one below for number of simulated periods equals to 20:

| Occ. | Period | Event |
|---|---|---|
| 1 | 1 | 101 |
| 2 | 2 | 101 |
| 3 | 2 | 201 |
| 4 | 4 | 302 |
| 5 | 5 | 101 |
| 6 | 8 | 201 |
| 7 | 10 | 101 |
| 8 | 11 | 101 |
| 9 | 11 | 301 |
| 10 | 15 | 101 |
| 11 | 17 | 101 |
| 12 | 18 | 101 |

Notice that occurrence key is unique in each row but period number can be repeated, specifying which occurrences belong to a specific period. If we group events by period, the same table can be represented as:

| Period | Event |
|---|---|
| 1 | 101 |
| 2 | 101, 201 |
| 4 | 302 |
| 5 | 101 |
| 8 | 201 |
| 10 | 101 |
| 11 | 101, 301 |
| 15 | 101 |
| 17 | 101 |
| 18 | 101 |

A graphical representation of this PET is provided in FIG. 5A, showing various events 501 and the periods, e.g., 502, within which they occur. The horizontal axis is not strictly a time scale; it merely indicates period number. Notice that only 10 periods out of the 20 simulated periods have any events in them at all. This makes sense because the sum of all event rates in the event table is equal to 0.61 and the probability of having zero events is exp (−0.61) which is equal to 0.54, which is consistent with the 10/20 simulation.

One statistic that can be obtained from the PET table is the implied rate of each event. Every row in this PET has basically a weight of 0.05 (i.e., 1/20). Thus, to calculate the implied rate, you should count the number of times an event has occurred and multiply it by 0.05. In the case of event 101 the implied rate would be 8 times 0.05 which is equal to 0.4, and the real event rate is 0.42, therefore the relative rate error is 0.02/0.42 or 4.8%.

There are two methods to define the number of times each event occurs in the PET:

1. Number of occurrences for each event is proportional to its rate (e.g. event 101 has a rate of 0.42, therefore it has occurred 0.42*20=8 times).
2. Define the total number of occurrences as the sum of all rates multiplied by the number of simulated periods (in this case 0.61*20 equals 12). And then pick 12 events from the event set randomly, with the chance of each event being picked proportional to its rate.

The RMS Simulation Platform product provided by Risk Management Solutions of Newark, California uses the latter method (which preserves total rate) and that is used in the embodiment discussed here. One problem with the first method is none of the events with a rate lower than the inverse of number of simulations will be present in the PET even once. The downside with the second method is that if one of those rare events gets selected, it will have an implied rate which can be orders of magnitude larger than the real event rate.

Weighted PET (WPET)

Figure 5B:
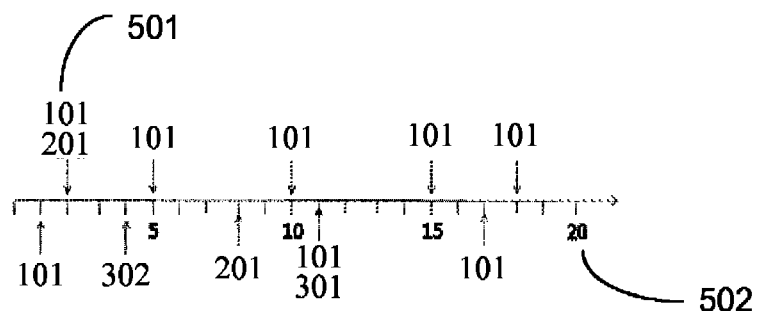
FIG. 5B illustrates a graphical representation of a WPET having a period number axis without a temporal correlation, in an embodiment.
Figure 5B:
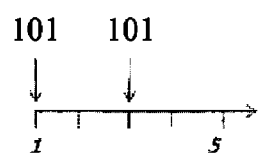
Figure 5B:
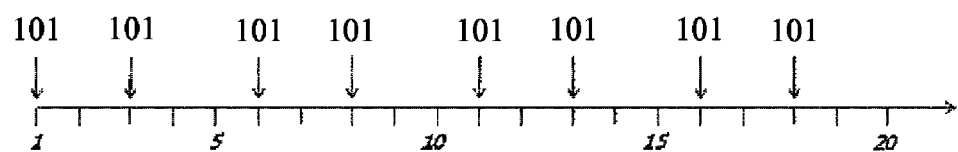

Now consider the same example, this time modeled using the weighted PET approach. First, start with simulating 5 periods. Event 101 will be simulated twice, say on periods 1 and 3, and no other event will be simulated. If the simulation was for 20 periods, event 101 would have been simulated 8 times (as seen in the regular PET method discussed above). Instead of simulating event 101 in 20 random simulation periods, the assumption here is that it happens at periods 1, 6, 11, 16, and 3, 8, 13, 18, i.e., the periods where the remainder is 1 or 3 when divided by 5. The graphical representation of this idea will look as shown in FIG. 5B. Again, the horizontal axis is not the time axis, but the period number axis without imposition of any temporal correlation. The assumption is simply the periods in which these events will happen on to help with reduced number keeping and storage space.

The next step is updating the rate of the events that got simulated. In this example the implied rate for event 101 is 2/5 or 0.4. Reducing this implied rate from the original rate gives the remnant rate of 0.02. Now, event 101 will have an updated rate of 0.02 in the event rate table.

| | Event ID | Event Rate |
|---|---|---|
| 1 | 101 | 0.02 |
| 2 | 201 | 0.1 |
| 3 | 301 | 0.05 |
| 4 | 302 | 0.05 |
| 5 | 401 | 0.01 |

Figure 5C:
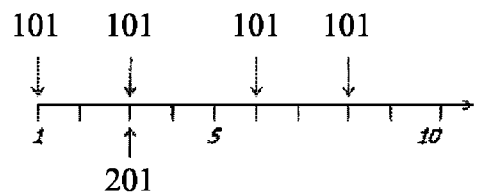
FIG. 5C illustrates a graphical representation of a WPET having ten simulated periods and a twenty simulated period equivalent, in an embodiment.
Figure 5C:
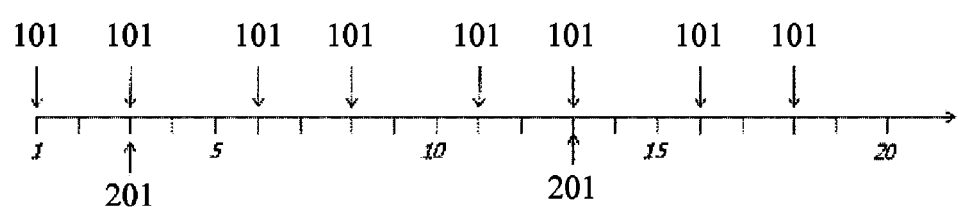

Next, simulation is performed for 10 periods. The only event to be simulated in this increment is event 201 (with a rate of 0.1). It happens to fall on period 3, so if the simulation were for 20 periods, it would fall on periods 3 and 13 (13 being the period which has a remainder of 3 when divided by 3). The graphical representation for the 10 simulated periods and for the imaginary 20 period equivalence will look as shown in FIG. 5C. The implied rate of event 201 is 1/10, and therefore the updated rate will be 0.1−1/10 or zero. The updated event rate table will look like:

|   | Event ID | Event Rate |
|---|---|---|
| 1 | 101 | 0.02 |
| 2 | 201 | 0 |
| 3 | 301 | 0.05 |
| 4 | 302 | 0.05 |
| 5 | 401 | 0.01 |

Figure 5D:
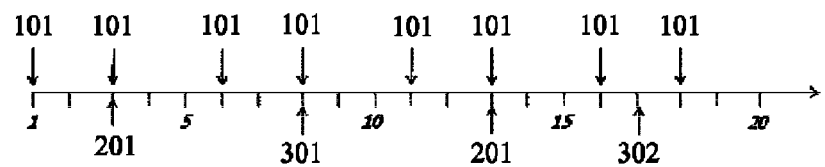
FIG. 5D illustrates a graphical representation of a WPET having twenty simulated periods with two events and a rate of 0.05, in an embodiment

Next, simulation is performed for 20 periods, with events 301 and 302 (with rates of 0.05) chosen. The graphical representation is shown in FIG. 5D and looks somewhat similar to that of the regular PET in terms of how many times each event is simulated. If the real rate is updated with implied rates, the event rate table that results is:

|   | Event ID | Event Rate |
|---|---|---|
| 1 | 101 | 0.02 |
| 2 | 201 | 0 |
| 3 | 301 | 0 |
| 4 | 302 | 0 |
| 5 | 401 | 0.01 |

Note that event 101 is still in the table. If simulation had proceeded to the next increment with 40 periods, event 101 would have been selected again, making the implied rate closer to the real rate and reducing the relative rate error. In fact, this error can be reduced to any arbitrarily small number as an input to the PET creation tool.

Computational efficiency in application of WPET comes from going from such graphical representations, which are similar to those using regular PET, to a table format, which can be much more concise than the RPET table. Since there is a pattern to how the events are repeated along periods, it is not necessary to store all the information in the axis. If event 101 happened on period 1, then with the weight information it is also known that event 101 happened on periods 6, 11, and 16, as well, so recording that information would be redundant. Thus, by redefining the occurrence of a "period" based on new, non-redundant information, a more compact representation is achieved: the following table will be enough to represent the information represented by FIG. 5D:

| Occ. | Period | Event | Weight |
|---|---|---|---|
| 1 | 1 | 101 | 1/5 |
| 2 | 2 | 101 | 1/10 |
| 3 | 2 | 201 | 1/10 |
| 4 | 3 | 101 | 1/20 |
| 5 | 3 | 301 | 1/20 |
| 6 | 4 | 101 | 1/20 |
| 7 | 5 | 302 | 1/20 |

Figure 5E:
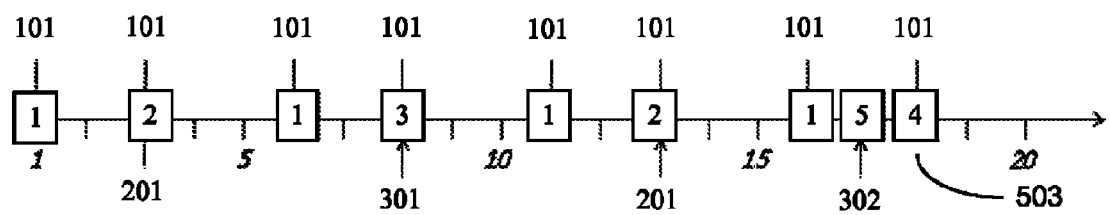
FIG. 5E illustrates a compact graphical representation of a WPET, in an embodiment.

The graphical representation of this way of looking at the events is illustrated in FIG. 5E, with the new periods 503 being illustrated by the numbers inside the boxes on the axis. This WPET has only 7 rows instead of the 12 rows for RPET. Grouped by the new periods, the table looks like:

| Period | Event | Weight |
|---|---|---|
| 1 | 101 | 1/5 |
| 2 | 101, 201 | 1/10 |
| 3 | 101, 301 | 1/20 |
| 4 | 101 | 1/20 |
| 5 | 302 | 1/20 |

Figure 5F:
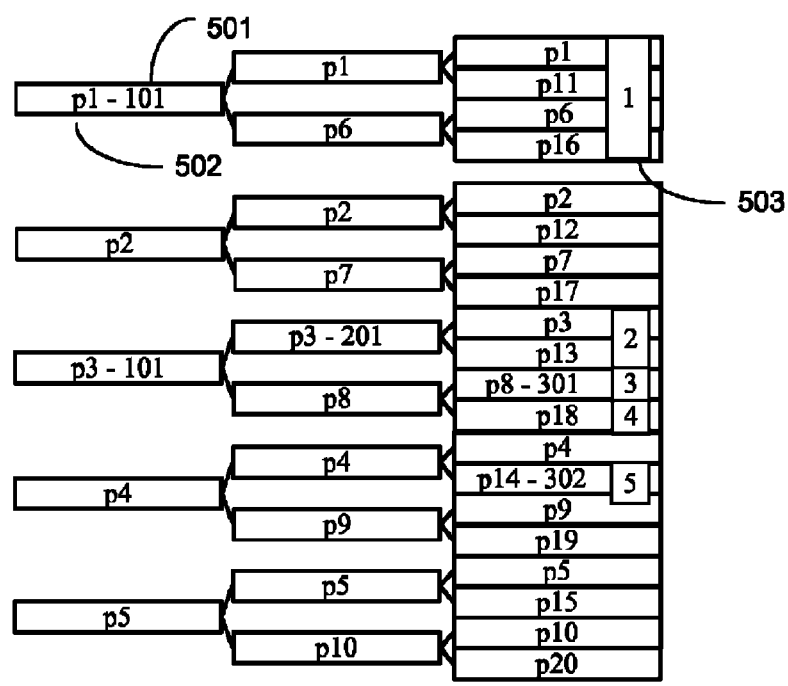
FIG. 5F illustrates a tree diagram of a WPET, in an embodiment.

The tree diagram of FIG. 5F provides another perspective of this arrangement. The events 501 are indicated in the columns along with the first of the original periods 502 in which they occur, as well as in subsequent columns with additional ones of the original periods 502 in which they occur, and the diagram is arranged to show the progression through the original periods 502 such that the leftmost column shows original periods 1-5, the middle column shows periods 1-10 grouped to show redundancy of events, and likewise the rightmost column shows original periods 1-20. The scarcity of meaningful information in this diagram is evident by the lack of events corresponding to many of these original periods 502—for instance periods 2 (and 7, 12 and 17) are carried in the diagram but do not correspond to any events. In the right column, the new periods 503 are illustrated, showing how they correspond with both the original periods 502 and events 501—none of the new periods is "meaningless" in the sense that it has no event associated with it. Further, grouping based on the new periods 503 allows consideration of each occurence of an event based on the original periods 502 with a single combined occurrence and the corresponding weight of the event. Thus, rather than keeping track of four events 101 in original periods 1, 11, 6 and 16, using the new period the only required storage is of the single instance of the event in new period 1 and its corresponding weight of 1/5, thereby reducing the overall size of the PET. The implied rate of every event in the table is calculated by adding the weights of the rows containing that event, for instance event 101 happens in periods 1, 2, 3 and 4 and therefore the total rate of event 101 is the sum of the weights of these periods, which is equal to 1/5+1/10+1/20+1/20=0.4.

In one embodiment, the original periods 502 are not completely ignored, as they are still helpful in combining PETs for a new peril by back tracking to the occurrence origin of each event, as further discussed herein.

Branching Out

Branching out refers to dividing a single period into two periods, each having a weight equal to half the weight of the original period. These new periods have identical events in them, and therefore the event rates will not be impacted by branching out. However, the factor index and the event dates for these events are different in two periods, thus providing more samples of each event.

In one embodiment the minimum number of occurrences (the minimum number of times each event has been sampled with a different factor) is an input to system 300. After the WPET is created as explained above, the processing traverses through the PET, finds all periods which contain events with only one sample, divides those periods into two with new factors and halving the weight. Next, processing repeats the same procedure for periods with events which only have two samples and keeps going until all events are sampled at least equal to the specified number.

Multi-Peril PET

In order to enable contracts with multi perils, the PET for those perils is either created at the same time, or if a peril is being added later, the initial number of simulated periods is set as a multiple of the initial number of periods with which the original PET was created.

Creating the PET for all perils at the same is the most straightforward approach, but it may not be the most efficient choice if a new peril is being added to an existing mix of perils. Thus, a strategy for adding a peril to an existing PET is preferred in some circumstances. Consider a situation in which the WPET example in the section above was previously created and now it is desired to add a new peril to it with the following event rate table:

| | Event ID | Event Rate |
|---|---|---|
| 1 | 501 | 0.1 |
| 2 | 502 | 0.05 |

Figure 6A:
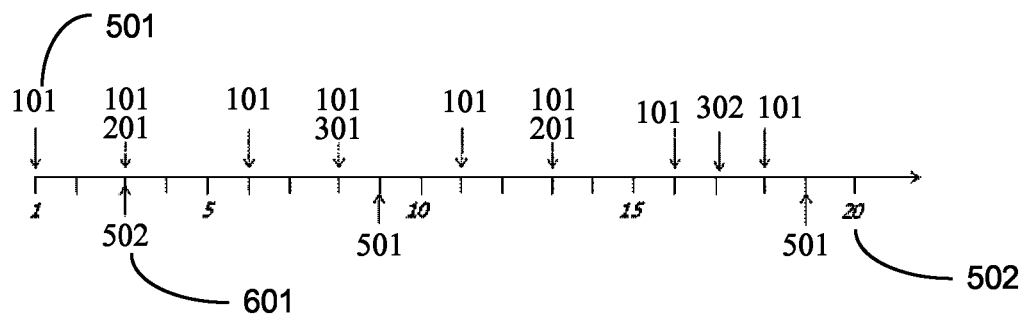
FIG. 6A illustrates further WPET event population.
Figure 6B:
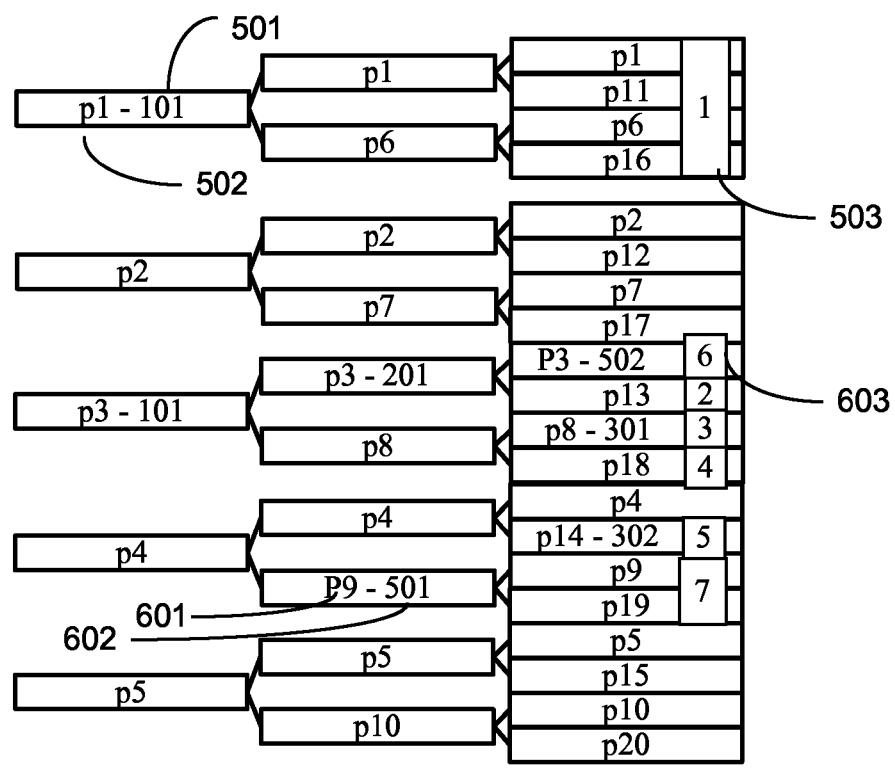
FIG. 6B is a tree diagram of the WPET event population shown in FIG. 6A, in an embodiment.

It would not be appropriate to simulate this peril separately and combine it with the previous WPET since period 'i' in one PET does not correspond to period 'i' in the other. Rather, processing proceeds through the WPET again and ensures that the WPET events for the perils which already exist are simulated exactly where they where simulated before and the new events are added at the proper place. This example is illustrated in FIG. 6A, with the new events 601 added to the original events 501 at the corresponding original periods 502. The tree diagram representation of this scenario is illustrated in FIG. 6B, with the addition of the new periods 603 as previously outlined. The resulting combined WPET for both perils is:

| Period | Event | Weight |
|---|---|---|
| 1 | 101 | 1/5 |
| 2 | 101, 201 | 1/20 |
| 3 | 101, 301 | 1/20 |
| 4 | 101 | 1/20 |
| 5 | 302 | 1/20 |
| 6 | 101, 201, 502 | 1/20 |
| 7 | 501 | 1/10 |

PET Validation
Rate Convergence and Poisson Distribution

In some implementations, it may be helpful to validate the extent to which the PET accurately represents the event set it was created from. In some embodiments, to implement such validation, processing can check how close the implied rate for each event calculated from the PET is with respect to the actual rate of that event. A maximum relative error of the implied rate with respect to the actual rate is provided as an input to the PET generation process, called "MaxRateTolerance" in one embodiment. The smaller this number, the larger the PET size will need to be. The implied rate for every event is calculated by summing up the weights of all the PET rows including that event. In one embodiment, histograms are produced to provide graphical illustration of differences between actual and PET-produced distribution functions for any particular input simulation. Likewise, bar graphs or other graphical representations are provided in some embodiments to illustrate error frequency or distribution as may be desired in any particular environment of use. In some further embodiments used in applications where geographical distribution of errors may be of interest, color coded maps are produced showing, based on determined simulation error magnitude, where simulation errors using the WPET processing described above occur with particular magnitudes. Such graphical representations may be helpful, for instance, to determine that even though an occasional simulation error may have a particularly high magnitude, it is in a location that is of only modest interest (e.g., a rural county rather than a major metropolitan area).

The discussion above included two WPET table formats, one based on occurrences and the other with period numbers as the primary key. Those skilled in the art will recognize from the discussion above that additional formats may be desirable in other environments, as it may be that a WPET in any particular implementation desirably includes a number of additional columns, such as: Occurrence, Period, EventID, FactorIndex, Year, Day, and Weight.

In one embodiment, implementation of the WPET file is accomplished by dividing the table into an 'index.bin' file and a 'data.bin' file. The 'index.bin' has three columns. The implicit row number is 'Period', the first column (int32) is the beginning occurrence (zero-based) for this period, the second column (int32) is number of occurrences in this period, and the third column (double) is the period. The 'data.bin' has five columns. The implicit row number (zero-based) is 'Occurrence', the first column (int32) is 'EventID', the second column is 'Year', the third column (int32) is 'Day', and the fourth column (int32) is TactorIndex'.

An application of a WPET-based method for modeling terrorism events provides another example of processing as disclosed herein. As discussed generally above, the weighted period event table (WPET) is a representation of the stochastic event set to represent event sets in a simulation platform. A single year WPET is essentially a collection of several realizations (denoted periods in this document) of events that could happen over the next year. A multi-year WPET is a collection of several periods of events that could happen over the next six years. In the WPET, the different periods are not equiprobable, but rather have weights associated with them (importance sampling). This is primarily done to ensure that both frequent and rare events from the stochastic catalog can be captured in the WPET without having to use an excessive number of periods (realizations). This document briefly summarizes the general WPET generation methodology and describes in the detail the generation of the WPET for a Probabilistic Terrorism Model (PTM).

The WPET is an approach used to generate a small catalog of events including rare events while preserving event rates. Essentially this approach involves the following steps:

a) Set initial number of periods to N.
b) Sample each event $\lfloor N*rate \rfloor$ times (where $\lfloor \ \rfloor$ denotes the floor operator) and place them in these N periods. Essentially only events with rates exceeding 1/N are sampled.
c) Assume that the sampled events recur every N periods (as discussed above).
d) Update the event rates considering the events that have already been assigned.

In other words, update event rates with their residual rates after assignment.

e) If the updated event rates are all not below a pre-specified threshold, double N.
f) Repeat steps b through e until the updated (i.e., residual) event rates all fall below the threshold.
g) Represent the assigned events in a compact structure using the periodicity of the assigned events (i.e., if we know event 101 recurs every 5 periods starting from period 1, represent that using one event 101 in period 1 with a weight of 1/5).

PTM has a Few Unique Aspects not Shared by Other Typical Catastrophe Models.
  a) Terrorism events occur frequently in clusters of 1 or more attacks (e.g., 9/11, 2005 London bombings). This issue is termed 'multiplicity' where attacks cluster together based on pre-defined cluster size probabilities. An attack cannot occur along with every other attack. Attacks that can cluster together have been pre-defined and identified by a parameter called 'high mode ID'.
  b) Terrorism event occurrences do not follow a Poisson distribution. After a terrorist event occurs, the rates for subsequent events reduce and the resulting frequency distribution is non-Poissonian.

The WPET generation methodology for PTM has to take into account the issues of multiplicity and non-Poissonian frequencies. This section describes the methodology used to generate a single year WPET for PTM. Much of the WPET generation methodology is similar to that described in the previous section for natural catastrophe models. This section primarily illuminates areas of differences.

Step 1: Initiate the Process

The WPET generation process is initiated with a starting number of periods ($N_p$) set to a reasonable value (e.g., 10,000).

Step 2: Perform Assignments for all High Modes, One High Mode at a Time

Step 2a: Determine Attacks that Belong to the High Mode Considered

Only attacks belonging to a particular high mode can happen together as an event. Hence, the rest of the steps described below only apply to the high mode considered. The steps have to be repeated for all high modes, one high mode at a time.

Step 2b: Determine Number of Occurrences of Each Attack in $N_p$ periods

The number of occurrences of attack a ($N_a$) is computed as $$N_a = \lfloor v_a N_p \rfloor \qquad (1)$$

where $\lfloor . \rfloor$ denotes the floor operation, and $v_a$ denotes the rate of event a.

Step 2c: Determine the Number of Clusters (a.k.a. Events/Event Clusters) of Various Sizes For the high mode considered, attacks happen in event clusters of various sizes as defined by a pre-specified multiplicity distribution. This distribution provides the probabilities of observing clusters of sizes 1 to 5. Using Equation 1, the total number of attacks happening in $N_p$ periods is calculable, and from that processing can separate them into clusters of sizes 1 to 5 based on the multiplicity distribution. Denote the multiplicity distribution as $$P(N_C = j) = m_j \qquad (2)$$

where $N_c$ is the number of attacks in a cluster, $m_j$ denotes the probability of observing a cluster of size j. From Equation 2, it can be inferred that the number of clusters of size j can be expressed as $m_j k$, where k is some constant. The total number of attacks is $$N_{total} = \sum_j jm_j k \qquad (3)$$

From Equation 1, it is also known that $$N_{total} = \sum_a \lfloor v_a N_p \rfloor \qquad (4)$$

The value of k can be estimated using Equations 3 and 4, and the total number of clusters of different sizes can be estimated as:

$$N_{cj} = \left\lfloor \frac{m_j}{\Sigma_j jm_j} \sum_a \lfloor v_a N_p \rfloor \right\rfloor \qquad (5)$$

The floor operators ensure integral numbers of events and clusters.

Step 2d: Assign Attacks to Event Clusters

The $N_{total}$ attacks are placed into clusters based on the cluster counts estimated in Equation 5. This assignment is done randomly. For instance, each cluster of size j is populated by a random collection of j attacks from the $N_{total}$ attacks.

Step 2e: Assign Events (a.k.a. Clusters) to Periods

The events need to be assigned to periods in accordance with the desired frequency distribution. This assignment is done using the following idea of conditional assignments:

Step (i): Assign the First Event Randomly Over $N_p$.

Step (ii): Assign the Second and Subsequent Events Conditioned on the First Event Assignment.

Step (iia): Compute the Probability of Assignment for Each Period

Suppose the desired frequency model is defined as follows:

$f_e(0) = 0.6141$ $f_e(1) = 0.2$, $f_e(2) = 0.15$, $f_e(3) = 0.05$.

Each period in the WPET could have zero to three events based on this frequency distribution. The probability that the event gets assigned to a period with x events is proportional to the probability of exceeding x events. The event can be in any of the periods among this set of periods with x events with uniform probability. The table below illustrates this for the above-mentioned example where the probability of an assignment to a set of periods with x previous events in each period. For instance, the assignment probability corresponding to the set of periods with 0 events equals P(0)=k*40. Given that the assignment happens to this set, if this set contains $N_{y0}$ periods, the event can get assigned to any of these periods with uniform probability $1/N_{y0}$. The value of k is computed such that the probabilities sum up to 1.

| | |
|---|---|
| 0 | k * 40% |
| 1 | k * 20% |
| 2 | k * 5% |
| 3 | k * 0% |

For instance, if $N_p$ is chosen as 10,000, the total number of assignments based on the above frequency distribution equals 6,500. The table below shows the achieved frequencies after assigning 6,500 occurrences to 10,000 periods using the above methodology.

| Number of occurrences | Target Frequency | Achieved Frequency |
|---|---|---|
| 0 | 0.60 | 0.6019 |
| 1 | 0.20 | 0.1957 |

-continued

| Number of occurrences | Target Frequency | Achieved Frequency |
|---|---|---|
| 2 | 0.15 | 0.1529 |
| 3 | 0.05 | 0.0495 |

Step (iib): Adjust the Assignment Probability for Each Period

It is possible to improve the match between the target and the achieved frequencies by further constraining the assignments. In $N_p$ periods, the expected number of periods with x events equals:

$$E(N_{p,x}) = f_e(x) N_p P_{total} \quad (6)$$

where $P_{total}$ is the sum of the conditional probabilities of all the events in the catalog (which is less than 1). A heuristic constraint is imposed that an event can be placed in a period with x−1 events only if the number of periods with x events (denoted $\hat{N}_x$) is less than the expected number shown in Equation 6 [$E(N_{p,x})$] during that particular assignment. It is to be noted that this constraint is evaluated during every assignment. Therefore, if at any point $\hat{N}_x$ falls below $E(N_{p,x})$, it is acceptable to place this event in a period with x−1 events, even if this constraint was not satisfied during some prior assignment.

Based on the above discussion, P(x), the assignment probability corresponding to the set of periods with x prior events, is set to 0 if $\hat{N}_{x+1} \geq [E(N_{p,x-1})]$.

Step 3: Expand the Size of the WPET if Necessary

Once the assignments are performed for all the high modes, the residual rates are computed for each attack. If any of the residual rates exceeds a pre-specified threshold (e.g., 1e-9), $N_p$ is doubled. Steps 2 and 3 are repeated until all the residual rates fall below the threshold.

There is complexity when expanding the size of the PET. When the initial size PET is created, all periods have the same weight and when clusters are identified and their number of occurrence, it is easy to assign them to different periods while satisfying the frequency distribution. However, in the subsequent phases, different periods already have different weights and assignment of clusters to each period should be done sequentially and at each step, the frequency distribution should be compared to the target distribution. The following steps summarizes the assignment of clusters to different periods when periods have different weights:

1) assign a cluster to a period randomly
2) check if that period or one or its virtual duplicates is available from previous phases
3) if the period exists, update the periods weight and its sequence as well as adding the new period with the new cluster added to it in addition to what clusters where available in that period before this phase. If it does not exist, create a new period with the new cluster assigned to it
4) update the frequency distributions
5) update the list of periods in each frequency distribution bin which will be used in each phase for cluster assignment Generation of a multi-year WPET for PTM While the above section describes the methodology to generate a single-year WPET, changes are necessary to generate a multi-year WPET. The key issue to be considered while generating a multi-year PET is the relationship between events happening in one year to the other. Because counter-terrorism measures are adopted following a terrorist event, the rates for subsequent events drop (e.g., impact of 9/11). This creates a dependence from one year to the other that needs to be explicitly accounted for. This can be handled using the concept of conditional frequencies.

Conditional frequency is defined as the probability of observing a certain number of events in a given year given the total number of events that have happened in prior years, i.e., $P(N_k = x | \Sigma_{m<k} N_m = i)$, where $N_m$ is the number of events in year m. In subsequent sections, this conditional frequency is denoted $f_e(x|N_{prev}=y)$ A sample table of conditional frequencies is shown below from information provided by Dr. Gordon Woo.

| Number of events in current year | No previous event | One previous event | Two previous events | Three previous events | Four or more previous events |
|---|---|---|---|---|---|
| 0 | 50.62% | 70.01% | 83.23% | 91.08% | 95.38% |
| 1 | 38.84% | 26.67% | 15.86% | 8.68% | 4.48% |
| 2 | 9.58% | 3.17% | 0.89% | 0.24% | 0.14% |
| 3 | 0.92% | 0.15% | 0.02% | — | — |
| 4 | 0.04% | — | — | — | — |

The WPET generation methodology needs to sample events following the conditional probabilities defined by the above table. The first year WPET is generated as discussed in the above section. For any subsequent year, the WPET generation methodology needs to reflect the following changes:

Event Rate Changes

During years 2 and above, the event rates will be lower than what is used for year 1. This is because of the reduction in the event frequencies following even occurrences in year 1. The new event rates can be quantified as shown below:

$$\hat{\lambda}_i = E(\text{\# events in year}) E(\text{multiplicity}) CP_i$$

$$= EE(\text{\# events in year}|\text{\# events in previous year}) E(\text{multiplicity}) CP_i$$

$$= \frac{1}{\text{\# periods}} \sum_{j \in periods} E(\text{\# events in year in period } j|$$

\# events in previous year in period $j$) $E(\text{multiplicity}) CP_i$ $$\lambda_i = E(\text{\# events in year} | \text{\# events in previous year} = 0) \quad (7)$$

$$\hat{\lambda}_i = \lambda_i \frac{\frac{1}{\text{\# periods}} \sum_{j \in periods} \frac{E(\text{\# events in year in period } j | \text{\# events in previous year in period } j)}{E(\text{multiplicity}) CP_i}}{E(\text{\# events in year} | \text{\# events in previous year} = 0)}$$

$$E(\text{\# events in year} | \text{\# events in previous year}) = \sum_{x=1}^{N_{max}} x f_e(x | \text{\# events in previous year})$$

where $\hat{\lambda}_i$ and $\lambda_i$ are the adjusted and unadjusted rates of event i respectively. The goal is now to match these adjusted rates during the WPET assignment rather than the unadjusted rates.

Assign Events (a.k.a. Clusters) to Periods
Assignment Probability Computation

The previous section illustrated how assignment probabilities are calculated for assigning events to periods based on the number of events already assigned to the period. Now the assignment probability calculation has to take into account the events assigned to that period in the current year and in all previous years. The conditional frequency table essentially assists in calculating the conditional assignment probabilities as described above. Suppose in period i, the sum of the assignments in years 1 and 2 is $N_1$, the relevant conditional probabilities for the number of events in year 3, denoted $N_2$, are obtained as $f_e(N_2|N_1)$. The first step in calculating the assignment probabilities is getting the joint conditional frequency $f_e(N_1+N_2|N_1)$. This can be done directly using the conditional frequencies. The corresponding assignment probabilities, $P(N_1+N_2|N_1)$ are obtained as described above. The probabilities we are interested in for simulation purposes are the unconditional probabilities which are obtained as $P(N_1+N_2,N_2)=P(N_1+N_2|N_1)P(N_1)$, where $P(N_1)$ can be empirically estimated as the proportion of periods with $N_1$ prior events. Finally, the unconditional assignment probabilities are normalized so that they add up to 1.

Assignment Probability Adjustment

The earlier section illustrated how the assignment probabilities need to be adjusted based on the constraint that $\hat{N}_{x+1} < [E(N_{p,x-1})]$ for achieving a good frequency distribution match. A similar adjustment needs to be performed for the multi-year case as well.

Of $N_p$ periods, the expected number of periods with a specific $(N_1+N_2, N_2)$ equals $$E(N_{p,N1+N2,N_1}) = f_e(N_1 + N_2 \mid N_1)\hat{P}(N_1)P_{total}N_p \qquad (8)$$

where $f_e(N_1+N_2|N_1)$ denotes the conditional frequency of $N_1+N_2$ given $N_1$, $\hat{P}(N_1)$ is the proportion of periods with $N_1$ prior assignments and $P_{total}$ is the sum of the conditional probabilities. A set of periods with event counts $(N_1+N_2,N_2)$ is considered for event assignment only if $E(N_{p,N_1+N_2+1,N_1}) > \hat{N}_{N_1,N_2+1,N_1}$ where $\hat{N}_{N_1+N_2+1,N_1}$ is the number of periods with event counts ($N_1$ prior, $N_1+N_2+1$ current+prior) The assignment probability for this period set is set to zero if this constraint is not satisfied.

Event Assignment

For event assignment, a set of periods with event counts $(N_1,N_1+N_2)$ is first chosen in proportion to $P(N_1+N_2|N_1)$, and the event is placed in a period randomly chosen from this set.

Once WPET is created with the methodology explained above based on the conditional frequenxy distributions of each year, the single year WPETs are combined into a single multi-year WPET. The challenge in combining years of different WPETs is that each one of these WPETs has a different number of simulations and also each simulation period has a different weight. When two WPETs are combined to create a multi-year WPET, the number of simulations should be the same and also the years that are combined together should have the same weight. This means that even if a WPET for the first year and second year both had the same number of periods, one cannot merely be put after the other to create the WPET for 2 years of simulations, since their weighs do not match.

To overcome this issue, the following approach is used in one embodiment for any two given single year WPETs. For simplicity, the discussion explains the combination of two single year WPETs into one 2-year WPET, but the same approach can be expanded to any number of years by combining the resulting multi-year WPET with a new single year WPET.

1. Loop over the periods of the WPET for the first year
2. Compare the weight of the first period from WPET 1 to the first period from WPET 2
3. Break the period which has higher weight into two periods such that the first new period has the same weight as the weight of the period from the other WPET.
4. Combine the first periods of WPET 1 and WPET 2 and create a 2-year period
5. Remove the first periods from the individual WPETs and continue the process until all periods of the WPET 1 are added to the multi-year WPET.
6. Add all the remaining periods of WPET 2 to the multi-year WPET for these periods, no event has occurred in the first year.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 4. Alternatively, hardware or software modules may be stored elsewhere within a computing system.

As referenced herein, a computer or computing system includes hardware elements necessary for the operations described here regardless of specific reference in FIG. 4 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or, for example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing machine processing of risk and resource allocation models in response to catastrophic events through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A computer-implemented method of modeling events, comprising:
    collecting individual event parameters;
    creating a weighted period event table responsive to the event parameters, the weighted period event table including a plurality of periods, and, for each period, one or more event types and a weighting, the weighting indicating a frequency at which the corresponding one or more event types occur; and
    generating a model responsive to the weighted period event table, the model assuming each event type occurs in a repeating pattern based on the corresponding frequency.

2. The computer-implemented method of claim 1, wherein the weighted period event table is of a size responsive to a maximum threshold error level.

3. The computer-implemented method of claim 1, wherein, wherein the weighted period event table is based on multiple period event tables.

4. The computer-implemented method of claim 3, wherein each of the multiple period event tables corresponds to a single year.

5. The computer-implemented method of claim 1, wherein the weighted period event table relates to occurrence of natural catastrophes.

6. The computer-implemented method of claim 1, wherein the weighted period event table corresponds to terrorist attacks.

7. A computer system for modeling events, comprising:
    a non-transitory computer-readable storage medium comprising executable computer program code for:
        collecting individual event parameters;
        creating a weighted period event table responsive to the event parameters, the weighted period event table including a plurality of periods, and, for each period, one or more event types and a weighting, the weighting indicating a frequency at which the corresponding one or more event types occur; and
        generating a model responsive to the weighted period event table, the model assuming each event type occurs in a repeating pattern based on the corresponding frequency; and
    a processor for executing the computer program code.

8. The computer system of claim 7, wherein the weighted period event table is of a size responsive to a maximum threshold error level.

9. The computer system of claim 7, wherein, wherein the weighted period event table is based on multiple period event tables.

10. The computer system of claim 9, wherein each of the multiple period event tables corresponds to a single year.

11. The computer system of claim 7, wherein the weighted period event table relates to occurrence of natural catastrophes.

12. The computer system of claim 7, wherein the weighted period event table corresponds to terrorist attacks.

13. A non-transitory computer-readable storage medium comprising executable computer program code for modeling events, the computer program code comprising instructions for:
    collecting individual event parameters;
    creating a weighted period event table responsive to the event parameters, the weighted period event table including a plurality of periods, and, for each period, one or more event types and a weighting, the weighting indicating a frequency at which the corresponding one or more event types occur; and
    generating a model responsive to the weighted period event table, the model assuming each event type occurs in a repeating pattern based on the corresponding frequency.

14. The non-transitory computer-readable storage medium of claim 13, wherein the weighted period event table is of a size responsive to a maximum threshold error level.

15. The non-transitory computer-readable storage medium of claim 13, wherein, wherein the weighted period event table is based on multiple period event tables.

16. The non-transitory computer-readable storage medium of claim 15, wherein each of the multiple period event tables corresponds to a single year.

17. The non-transitory computer-readable storage medium of claim 13, wherein the weighted period event table relates to occurrence of natural catastrophes.

18. The non-transitory computer-readable storage medium of claim 13, wherein the weighted period event table corresponds to terrorist attacks.

* * * * *